United States Patent [19]
Emmerson et al.

[11] 3,719,365
[45] March 6, 1973

[54] SEAL STRUCTURE

[75] Inventors: Calvin E. Emmerson, Indianapolis, Robert A. Griffin, Sheridan, George B. Meginnis, Indianapolis, all of Ind.

[73] Assignee: General Motors Corporation, Detroit, Mich.

[22] Filed: Oct. 18, 1971

[21] Appl. No.: 190,179

[52] U.S. Cl. ...................277/53, 415/174, 416/97
[51] Int. Cl. ........................F01d 11/08, F02f 11/00
[58] Field of Search.....277/53, 96 A, 96 R; 415/174; 416/97

[56] References Cited

UNITED STATES PATENTS

| | | | |
|---|---|---|---|
| 3,603,599 | 9/1971 | Laird | 277/96 R |
| 3,529,905 | 9/1970 | Meginnis | 277/96 R |
| 3,365,172 | 1/1968 | McDonough et al. | 277/53 UX |
| 3,411,794 | 11/1968 | Allen | 277/53 |

*Primary Examiner*—Samuel B. Rothberg
*Attorney*—Paul Fitzpatrick et al.

[57] ABSTRACT

A porous cooled seal ring adapted to cooperate with blade tips, seal knives or, generally, the other element of a labyrinth type seal has a special laminated structure providing controlled porosity, abradability of the metallic structure, and discharge of air from the seal in a direction generally accordant with the movement of the other seal element.

6 Claims, 8 Drawing Figures

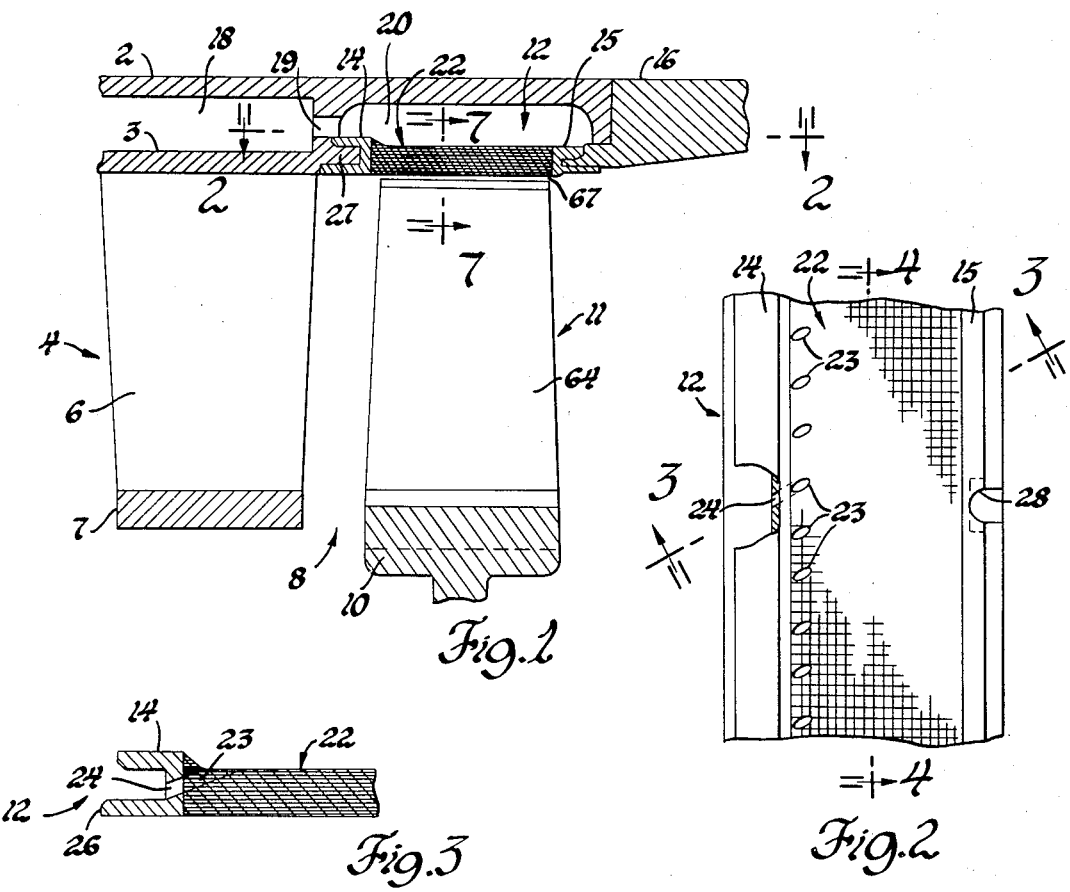
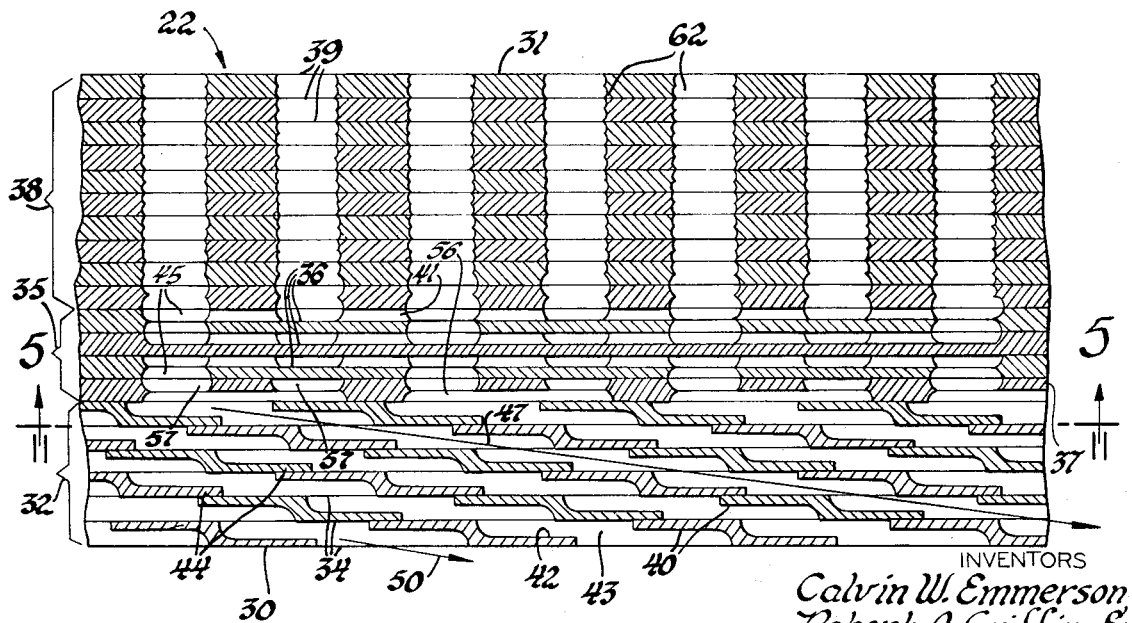

INVENTORS
Calvin W. Emmerson,
Robert A. Griffin &
BY George B. Meginnis

Paul Fitzpatrick
ATTORNEY

SEAL STRUCTURE

The invention described herein was made in the course of work under a contract with the Department of Defense.

Our invention is directed to providing improved porous structures, ordinarily in ring form, to provide a porous gas-cooled abradable element of a labyrinth seal or other structure of this general sort.

It is well known that rotating machines such as compressors and turbines, for example, ordinarily have parts rotating at high speed relative to each other across which there are pressure differences which make provision of seals to minimize leakage very important. Particularly in larger machines for aircraft in which the structure is relatively light and in those in which thermal expansion is quite considerable, there arise serious problems of minimizing clearance of blade tip or other labyrinth type seals without destructive rubbing of the parts. This problem has led to various proposed abradable seal elements, among them porous metallic structures such as those shown in U.S. Pat. No. 3,365,172 to McDonald, Jan. 23, 1968; No. 3,411,794 to Allen, Nov. 19, 1968; and No. 3,529,905 to Meginnis, Sept. 22, 1970. By providing a sufficiently open, reticulate, or porous structure, a metallic seal element may be sufficiently abradable or crushable that contact with the rotating tips, ridges, or knives on the other member of the labyrinth seal will provide the necessary clearance for rotation without damaging the other part of the seal or destroying the effectiveness of the abradable part.

In many cases it is considered desirable to cool the parts of the seal, which may be done, for example, by passing air diverted from the compressor of a gas turbine engine through a porous seal ring with the air exhausting into the space between the two elements of the seal.

We consider it desirable to provide a structure for a cooled seal giving efficient and consistent use of the cooling air along with an abradable structure of such nature that wear or abrasion of the sealing face of the ring does not harmfully alter the fluid flow characteristics of the ring. We also consider it quite desirable to provide a structure such that the cooling air is discharged from the cooled seal ring in a tangential direction according with the direction of movement of the other element of the seal. This minimizes fluid friction opposing relative movement of the parts and tends to energize any stagnant boundary layer adjacent the seal ring.

The objects of our invention are to provide improved labyrinth seal structures, to provide improved cooling arrangements for labyrinth seals of turbomachines, and to provide improved porous laminated structures particularly suited for use as seal rings. As used here, the term "labyrinth" applies to any seal in which leakage occurs between a surface on one member and an edge or ridge on another, or a plural number of edges or ridges.

The nature of our invention and the manner in which these objects are achieved will be clearly understood from the succeeding detailed description of the preferred embodiment of the invention and the accompanying drawings.

FIG. 1 is a somewhat schematic sectional view of an axial-flow turbine taken on a plane containing the axis of rotation.

FIG. 2 is a partial exterior view of a seal ring embodying the invention, as indicated by the line 2—2 in FIG. 1.

FIG. 3 is a partial sectional view of the same, taken on the plane indicated by the line 3—3 in FIG. 2.

FIG. 4 is a greatly enlarged fragmentary cross sectional view taken on the plane indicated by the line 4—4 in FIG. 2.

Figure 5:
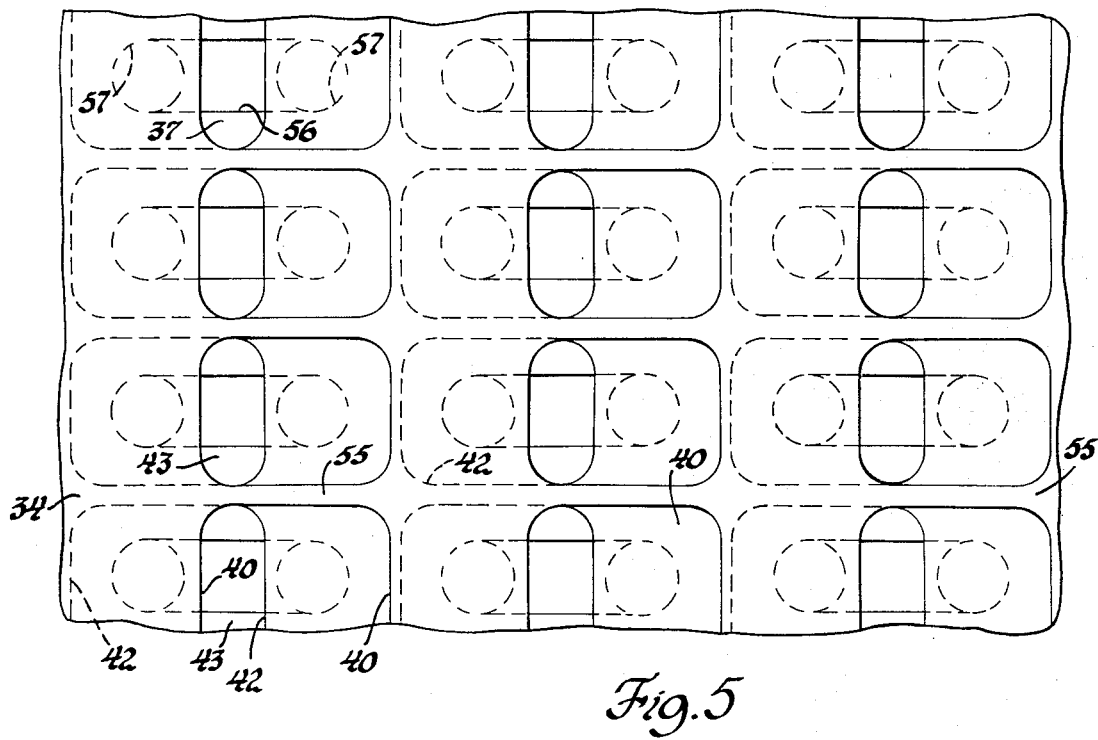
FIG. 5 is an enlarged sectional view taken on an interface between laminae as indicated by the line 5—5 in FIG. 4.

FIG. 1, which illustrates one environment for use of our invention, shows sufficient of the structure of an axial-flow turbine to explain a use of the improved seal. In FIG. 1, a turbine case 2 has mounted within it by any suitable conventional means the outer shroud 3 of a turbine nozzle 4, which includes an annular cascade of vanes 6 and an inner shroud 7. The nozzle 4 directs motive fluid to a rotor stage 8 comprising a wheel 10, only the peripheral portion of which is illustrated, and an annular row of blades 11 extending radially from the wheel. A fixed shroud or seal structure 12 extending around the rotor immediately adjacent the tips of the blade 11 embodies our invention. This shroud is a composite structure including a forward channel section ring 14 and a rear channel section ring 15. The forward ring pilots onto the rear edge of the turbine nozzle shroud 3 and the rear ring engages a forwardly projecting flange on an annular wall structure 16, which may be the turbine exhaust duct or may be the case for a succeeding turbine stage. The shroud 12 is of a porous nature so as to be cooled by air supplied to it. This air, which may come from the compressor (not shown) of the engine is supplied through the space 18 outside shroud 3 and through the ring of openings 19 into a chamber or plenum 20 between the case 2 and shroud 12. Except for the structure of the shroud 12 to be explained, the organization just described may be considered conventional and may incorporate various known suitable details of structure.

Our invention is primarily concerned with the porous abradable seal structure or ring 22 which forms the principal part of the volume of the shroud 12, the portion 22 being diffusion bonded or otherwise fixed to the forward ring 14 and rear ring 15 to define the complete seal ring. Preferably, this shroud 12 is segmented and, in the particular example described, it is in eight 45° segments. Referring also to FIGS. 2 and 3, holes 23 through the porous ring 22 and holes 24 through the forward ring 14 provide for escape of excess cooling air from the plenum 20 into the clearance between the radially inner flange 26 of ring 14 and the rear edge 27 of the nozzle shroud on which it is mounted. These holes, in the example described which is of about ten inch radius, are spaced about three to the inch and the holes are approximately 0.057 inch in diameter. They may be drilled after the shroud 12 has been assembled. The reason for these holes is that the cooling air is supplied through the space 18 for general turbine cooling purposes in the engine described in greater quantity than is needed to cool the seal ring 22, the excess cooling air being bled off through the passages 23, 24. Typically, about two-fifths to three-fifths of the air may be bled off.

Each rear ring segment 15 includes a notch 28 which receives a locating projection or key (not illustrated) to hold the segment in its proper circumferential position in the turbine case.

The showing in FIG. 1 is not necessarily to scale. To give an idea of the nature of the structure in a preferred embodiment, the porous seal structure 22 is approximately two-tenths inch thick and the overall axial length of the shroud 12 is about 2 inches.

Proceeding now to the preferred structure of the porous seal structure 22, with reference primarily to FIGS. 4 and 5, in the example described the porous structure 22 is a laminated structure made up of twenty sheets, each approximately 0.010 inch thick, diffusion bonded together to form a unitary rigid structure. This laminated structure is clearly illustrated in FIG. 4 in which the seal face is indicated at 30, this being the radially inner surface in the illustrated example; and the outer face which bounds the cooling air plenum 20 is indicated at 31. The sheets are in three groups or layers, the first layer 32 being a lamination of a number of abradable sheets 34. The second group or layer is a metering layer 35 made up principally of metering sheets 36. The third group or layer 38, which may be termed a backing or reinforcing layer, is made up of perforated sheets 39.

Each abradable sheet 34 has a pattern of pits 40 etched into one face of the sheet and pits 42 etched into the other face, these overlapping to define openings 43. The shapes of the pits and opening is roughly a rounded corner rectangle, as is apparent in FIG. 5. The lands between the pits on each sheet overlie the lands on the next lower sheet at areas indicated at 44 in FIG. 4 so that the sheets are in contact to be bonded together. With the 0.010 inch thick sheets, we prefer the pits 40 and 42 to be about 0.007 inch deep, leaving about 0.003 inch of metal.

With this structure, it will be noted that the successive sheets 34 provide an array of passages for flow of cooling fluid through the layer 32 to face 30, one of which is indicated by arrow 47. All these passages are at a small angle to the face of the porous seal material so that the air is discharged approximately tangent to the surface of the seal material as indicated by the arrow 50.

Figure 6:
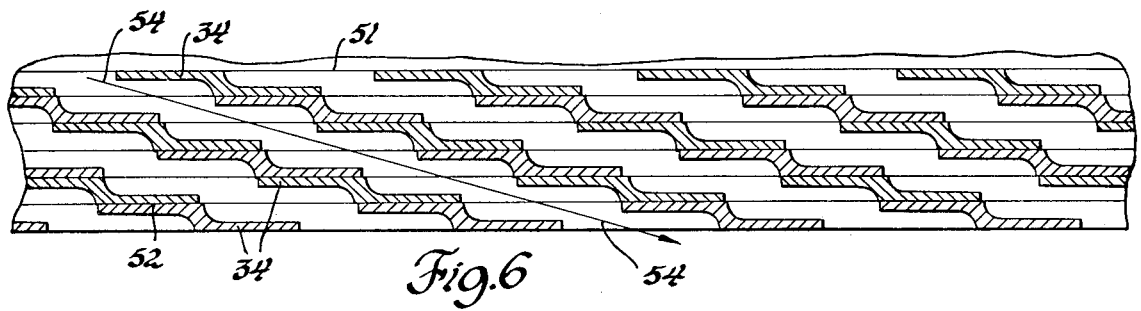
FIG. 6 illustrates a modification of the structure of FIG. 4.

FIG. 6 illustrates a slightly different structure of the abradable layer, this abradable layer being indicated as 51 and being made up of sheets 34 as previously described. However, in this case, the overlap between lands of adjacent sheets, as shown at 52, is greater. The result is that the cooling air passages are slightly shorter and the angle to the face of the seal slightly greater as indicated generally by the arrow 54 in FIG. 6. As will be apparent from the drawings, the structure of the abradable layer is rather porous, since preferably more than half of the metal of the original sheets is removed to form the pits 40 and 42. Adjacent rows of pits in the direction axially of the engine; that is, the direction of the section of FIG. 1, are quite close together with a narrow strip as indicated at 55 between the rows.

Because of its abradable structure, layer 32 may be readily cut away by interference with the other member of the seal, such as a blade tip or labyrinth seal ridges. Also, since the abradable layer is made up of a considerable number of sheets (six in this particular case), a very considerable amount of abrasion can occur without significantly altering the general character of the seal and particularly its conformation which directs the cooling air from the face in the direction of movement of the other member with which it cooperates.

A further point lies in the use, in this high temperature application, of thoria dispersed nickel chrome alloy sheets for the layer 32. This material has desirable qualities of structural weakness and low ductility at high temperatures along with very high resistance to oxidation by the turbine motive fluid.

In order to maintain control of the cooling flow notwithstanding abrasion of the abradable layer, the abradable layer is made more porous than the metering layer 35 through which the cooling air flows to the abradable layer. The metering layer defines an array of passages which may be configured to have such flow resistance as to pass the desired amount of cooling air. As indicated in FIG. 4, the metering layer 35 comprises three sheets 36 and one sheet 37. The sheets 36 have an array of bosses 41 on one face of the sheet and have holes 45 through the sheets distributed over the sheet, with the holes in adjacent sheets out of register. Such a laminated porous structure is described in Bratkovich et al U.S. Pat. No. 3,584,972, June 15, 1971.

The sheet 37 acts as a sort of spreader or manifold, and may be called a distributing sheet. It matches with the holes in the adjacent sheets 36 and 34. As shown in FIGS. 4 and 5, the passages through sheet 37 are defined by elongated grooves 56 etched approximately half-way through the thickness of the sheet from one face, each of which is intersected by two circular pits 57 etched in from the other face of the sheet and entering the ends of the groove 56. The groove 56 of the sheet 36 immediately adjacent the abradable layer 32 is disposed in register with the pit 42 of the adjacent sheet 34 to provide for conduction of the cooling fluid into each of the passages through the abradable layer.

The abradable and metering layers comprise what may be considered the active part of the seal structure but, in the preferred structure just described, these would have a very small total thickness and, because of the openness of the structure, would have very little rigidity; therefore, it is desirable to provide a reinforcing structure both to make the seal segments of greater strength for handling and also to provide strength to resist the force which is exerted against them by the difference in pressure between the gas in the plenum 20 and that in the turbine motive fluid passage through the blades 11. This matter of pressure difference will not arise in all applications of the invention but, in the one herein described, the pressure in plenum 20 would be close to that ahead of the turbine nozzle and considerably greater than that at the turbine rotor stage. It is necessary, of course, that the reinforcing structure conduct the cooling air to the remaining parts of the seal structure, and it is also desirable that it be of relatively light weight for its strength in many applications, such as aircraft engines. Preferably, the sheets 39 of the layer 38 define a rectangular pattern of through-holes or perforations 62. These holes may be provided by photoetching aligned pits from opposite faces of the sheet.

The layers 35 and 38 may be made of any suitable alloy. A favored material is Hastelloy X (trademark).

The use of photoetching for providing the various holes, pits, grooves, and the like is preferred in the case of many materials. Such photoetching is old and well known and it is not considered necessary to describe it. Also, if the materials employed in the seal structure are adaptable to formation of the structure by other procedures than photochemical etching, such may be employed. For example, it is obvious that the holes 62 might be provided in many materials by a simple multiple punching operation.

After the various sheets have been photoetched or otherwise formed to the desired configuration, they are cleaned and joined by any suitable process, the most suitable in most cases being diffusion bonding, although brazing might be suitable in some cases. By photoetching so as to leave solid borders on all sheets, diffusion bonding will consolidate rings 14 and 15 at the same time seal is bonded.

Figure 7:
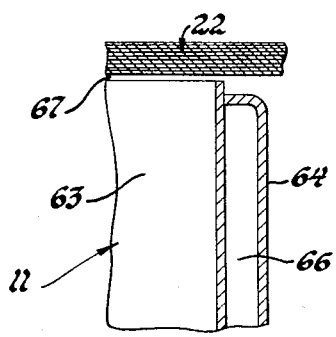
FIG. 7 is a cross sectional view illustrating the relation of blade tip and seal, taken on the plane indicated by the line 7—7 in FIG. 1.

FIG. 7 illustrates the use of a porous seal structure 22 with the blade 11 which, as shown, has a concave or pressure face 63 and a convex face 64 and defines an interior cavity 66 into which cooling air may be supplied. Any desired means of cooling the blade 11 may be employed such as, for example, those described in Bratkovich and Meginnis U.S. Pat. No. 3,584,972 issued June 15, 1971. In the structure illustrated in FIG. 7, the pressure face of the blade extends to form a seal ridge 67 at the tip of the blade which moves in as close as possible relation to the seal structure 22. The clearance is exaggerated for clarity in this view and in FIG. 1.

Figure 8:
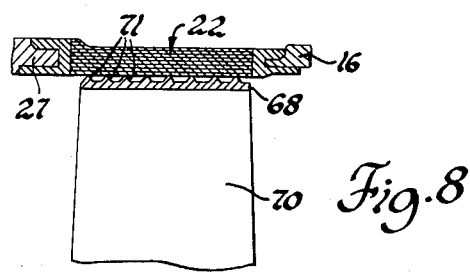
FIG. 8 is a partial view similar to FIG. 1 illustrating a shrouded rotor.

FIG. 8 illustrates the use of the seal structure 22 with another form of labyrinth seal, in this case the labyrinth seal being provided by blade tip shroud 68 on the tips of rotor blades 70 which may be of any suitable character. The shroud 68, which may be segmented or not, bears sealing ridges or knives 71 on its outer surface which move in contact or substantially in contact with the abradable seal structure 22. It will be seen, in the case of any of the structures illustrated, that if there is actual physical contact between the moving part and the seal structure 22, abrasion may take place. In both cases the direction of outflow from the seal structure is in the direction of movement of the part 11 or 70.

Obviously, the labyrinth seal structure 68 might be part of any labyrinth seal and need not be a blade tip seal.

Also, it will be apparent that the principle of the invention may be employed with a seal in which the gap between the seal members is an axial gap rather than a radial gap as shown in the drawings, and that the porous structure may be the inner member of a radial gap seal rather than the outer member as illustrated.

It will be apparent to those skilled in the art that we have devised a seal which has ample strength, a very open structure, ability to resist high temperature, made of appropriate alloys, which is adapted to discharge the cooling fluid in the direction of movement of the other part of the seal notwithstanding considerable abrasion of the porous seal structure, and which offers dependable control of cooling air flow.

The detailed description of preferred embodiments of the invention for the purpose of explaining the principles thereof is not to be considered as limiting or restricting the invention, since many modifications may be made by the exercise of skill in the art.

We claim:

1. A porous abradable seal structure adapted to provide one element of a gas-cooled labyrinth seal or the like and having a seal face adapted to cooperate with the other element thereof, the structure comprising a plural number of sheets bonded together into a laminated structure with the sheets extending parallel to the seal face of the structure, a plural number of said sheets beginning at the seal face being abradable sheets having overlapping offset intersecting pits closely distributed over the area thereof to provide a low-density abradable layer having cooling gas flow paths discharging at an acute angle to the seal face, the number of said abradable sheets being sufficient to preserve the angular discharge notwithstanding substantial abrasion of the layer by the other seal element, the said sheets including also a plural number of porous sheets defining a cooling gas metering layer underlying the said abradable layer adapted to transmit the cooling gas to the abradable layer and to predominantly control by throttling the flow through the abradable layer, the abradable layer having lower resistance to gas flow than the metering layer so as to minimize disturbance of cooling gas flow rate by abrasion of the abradable layer.

2. A porous abradable seal structure adapted to provide one element of gas-cooled labyrinth seal or the like and having a seal face adapted to cooperate with the other element thereof, the structure comprising a plural number of sheets bonded together into a laminated structure with the sheets extending parallel to the seal face of the structure, a plural number of said sheets beginning at the seal face being abradable sheets having overlapping offset intersecting pits closely distributed over the area thereof to provide a low-density abradable layer having cooling gas flow paths discharging at an acute angle to the seal face, the number of said abradable sheets being sufficient to preserve the angular discharge notwithstanding substantial abrasion of the layer by the other seal element, the said sheets including also a plural number of porous sheets defining a cooling gas metering layer underlying the said abradable layer adapted to transmit the cooling gas to the abradable layer and to predominantly control by throttling the flow through the abradable layer, the abradable layer having lower resistance to gas flow than the metering layer so as to minimize disturbance of cooling gas flow rate by abrasion of the abradable layer, the said sheets also including a plural number of perforated sheets defining a reinforcing layer, the perforations of the reinforcing layer being adapted to transmit the cooling gas to the metering layer.

3. A structure as defined in claim 2 in which all the said sheets are of the order of ten thousandths of an inch in thickness.

4. A structure as defined in claim 2 in which all the said sheets are of the order of ten thousandths of an inch in thickness, the structure comprising also an end member on one end of the seal structure and including passages defined by the reinforcing layer and end member to divert excess cooling fluid past the abradable layer.

5. A porous abradable seal structure adapted to provide one element of a gas-cooled labyrinth seal or the like and having a seal face adapted to cooperate with the other element thereof, the structure comprising a plural number of sheets bonded together into a laminated structure with the sheets extending parallel to the seal face of the structure, a plural number of said sheets beginning at the seal face being abradable sheets having overlapping offset intersecting pits closely distributed over the area thereof to provide a low-density abradable layer having cooling gas flow paths discharging at an acute angle to the seal face, the number of said abradable sheets being sufficient to preserve the angular discharge notwithstanding substantial abrasion of the layer by the other seal element, the abradable sheets being of a dispersion-strengthened nickel-chromium alloy, the said sheets including also a plural number of porous sheets defining a cooling gas metering layer underlying the said abradable layer adapted to transmit the cooling gas to the abradable layer and to predominantly control by throttling the flow through the abradable layer, the abradable layer having lower resistance to gas flow than the metering layer so as to minimize disturbance of cooling gas flow rate by abrasion of the abradable layer.

6. The combination of a first member defining a porous abradable seal having a seal face and comprising a plural number of sheets bonded together into a laminated structure with the sheets extending parallel to the seal face of the structure, a plural number of said sheets beginning at the seal face being abradable sheets having overlapping offset intersecting pits closely distributed over the area thereof to provide a low-density abradable layer having cooling gas flow paths discharging at an acute angle to the seal face, the number of said abradable sheets being sufficient to preserve the angular discharge notwith-standing substantial abrasion of the layer, the said sheets including also a plural number of porous sheets defining a cooling gas metering layer underlying the said abradable layer adapted to transmit the cooling gas to the abradable layer and to predominantly control by throttling the flow through the abradable layer, the abradable layer having lower resistance to gas flow than the metering layer so as to minimize disturbance of cooling gas flow rate by abrasion of the abradable layer; and a second member having edges cooperating with the first member to provide a seal of a labyrinth type, the two members being relatively rotatable and the direction of discharge of the cooling gas from the first member being the direction of relative rotation of the second member.

* * * * *